March 8, 1938.    E. SEIBOLD    2,110,741
HYDRAULIC VARIABLE SPEED TRANSMISSION
Filed Sept. 9, 1933    6 Sheets—Sheet 2

March 8, 1938. E. SEIBOLD 2,110,741
HYDRAULIC VARIABLE SPEED TRANSMISSION
Filed Sept. 9, 1933 6 Sheets-Sheet 5

Patented Mar. 8, 1938

2,110,741

UNITED STATES PATENT OFFICE 2,110,741

HYDRAULIC VARIABLE SPEED TRANSMISSION

Ernst Seibold, Heidenheim-on-the-Brenz, Germany, assignor, by mesne assignments, to American Voith Contact Co. Inc., New York, N. Y., a corporation of New York Application September 9, 1933, Serial No. 688,727
In Germany September 10, 1932

3 Claims. (Cl. 60—54)

My present invention relates to new and useful improvements in self-contained hydraulic transmissions, the invention being more particularly related to hydraulic variable speed transmissions.

The application of well-known hydro-dynamic transmissions, based on the principle of circulating liquids as developed by Prof. Hermann Föttinger, has heretofore been fundamentally limited due to the fact that, while such transmissions work smoothly and flexibly at the constant speed of the driving shaft, they yield good efficiencies only over a comparatively small speed range of the driven shaft. In many instances, however, it is essential that the primary power be fully available over a range of the secondary speed as great as possible, as for instance, in connection with the power transmission for automotive vehicles. For this reason hydraulic power transmission has heretofore been inferior, so far as efficiency is concerned, to mechanical transmission with gears or to electrical transmission.

On the other hand, hydraulic transmission possesses advantages over mechanical and electrical transmissions in regard to simplicity in operating the same, in wear, safety of operation, weight and cost. These advantages, however, cannot be realized so long as there is no hydraulic transmission which will satisfy the requirement as to efficiency.

The attempt has been made to obtain good efficiency over a wide range of the secondary speed by shifting some of the wheels or by having some of the wheels intermittently stopped or rotated with other wheels, thus creating several transmission ratios in an effective arrangement. But appparatus of this kind are objectionable in that they not only embody complicated devices, reducing thereby the safety of operation and the simplicty of control, but they are also cumbersome, heavy and expensive.

In accordance with the present invention, the problem is solved in the most simple manner and with entire safety in operation, through the provision of the several completely self-contained hydraulic transmissions or torque changers, each having a different transmission ratio, and so combined and operated that at all times the particular transmission which will most efficiently take care of the torque required is available for selection and operation. The process of changing from one transmission device to another is effected simply by draining the working liquid from the device in operation and concurrently filling the one which will give the desired torque ratio. Pursuant to the principle of my invention, the change from one transmission device to another may be accomplished without affecting the torque on the driven shaft. Important advantages are obtained by combining a hydraulic flow coupling (transmission ratio 1:1) with one or several hydraulic transmissions for stepping down the speed.

My invention may be usefully employed, for example, in connection with automotive vehicles.

One of the objects and purposes of the invention is to combine in an operative self-contained unit two or more torque changers, of which one may be a coupling.

Another object is to provide an arrangement of this character which is operated in accordance with hydraulic flow principles.

Another object of the invention is to simplify the control of the apparatus by alternately filling or emptying, as the case may be, one or more of the individual torque changers. Such simplification of control is obtained by a construction in which the primary wheels of the individual devices are connected to the primary or driving shaft and in which the secondary wheels of such individual devices are connected to the secondary or driven shaft.

Another object is to provide such coaction and cooperation between the various devices that the torque on the driven shaft will not be affected or changed while changing from the operation of one of the devices to the operation of the other of the devices. Stated in a different way, I make it possible correspondingly to control the emptying and filling processes of the respective devices.

It is also within the province of my invention to arrange each one of the devices for a specific range of torque change within the required total maximum torque change so as to provide for the highest possible efficiency for the respective ranges within the maximum total torque change required.

It is a further object to provide a unitary arrangement of torque changers by means of which to obtain increased efficiency in respect to the amount of power required for operation by effectually decreasing the inherent loss of energy in transmission.

Still another object is to provide an arrangement of the character described with which may be combined as an individually functioning part thereof a hydraulic flow coupling through the agency of which the energy is transmitted at an efficiency of close to 100 percent whenever no torque change is required, that is, for instance, when an automotive vehicle is traveling substantially on a level stretch.

Further objects of the invention are: to provide means for the proper admission of working liquid to the rotating parts of the transmission and coupling, and, under certain conditions, to effect the filling operation in the shortest possible time; and further to provide for the discharge of such liquid from the rotating parts in a shock-free manner, and in such a way that the liquid will be promptly drained away from the rotating parts in a manner that will preclude its contact therewith again, whereby to avoid waste of energy.

The invention also involves in connection with the primary and secondary shafts, a planetary gear coupling system arranged to drive the secondary shaft from the primary shaft and which is operable in such manner that the secondary shaft can, at will, be driven from the primary shaft either at the same speed rate or at a lower speed.

With the foregoing and other objects in view, the invention consists in the mode of operation and in the construction and arrangement of parts so combined as to coact and cooperate with each other in the performance of the functions and the accomplishment of the results herein contemplated, and comprises in its evolvement the simple and practical examples illustrated in the accompanying drawings, in which:—

Fig. 10 is a vertical sectional view through a section of a torque changer with spiral for the admission of liquid;

Fig. 10a is a vertical sectional view through a section of a hydraulic coupling with spiral for the admission of liquid;

Fig. 11 is a cross section through the intake spiral, taken on the line 11—11 of Fig. 10 or Fig. 10a;

Fig. 12 is a sectional diagram indicative of the velocities obtained for the working liquid entering the wheel from the spiral;

For purposes of illustration, I have shown my present improvements as embodied in hydro-dynamic transmissions of the general character upon which numerous patents have heretofore been issued to Prof. Föttinger, and more particularly to Letters Patent of the United States, issued to the said inventor and numbered 1,199,359, dated September 26, 1916, whereto general reference may be had in respect to devices of this class and in respect to primary and secondary wheels rotating by circulating liquids.

Figure 1:
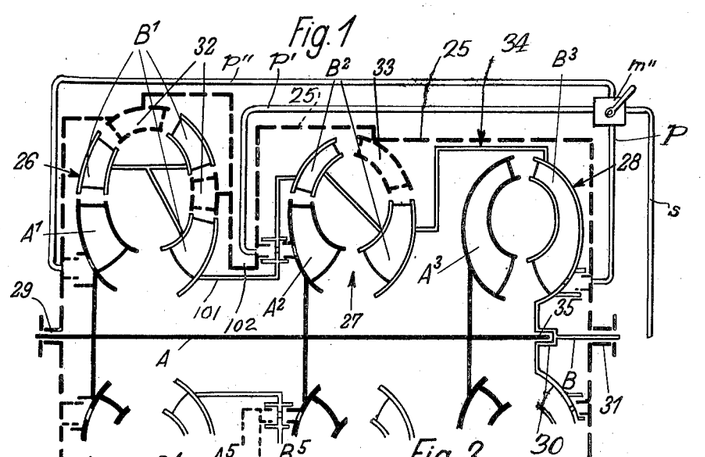
Figure 1 is a diagrammatic illustration, showing a hydro-dynamic transmission embodying the invention and consisting of two transmission changers in combination with a flow coupling.

Referring with more particularity to the accompanying drawings, and first to the exemplification diagrammatically illustrated in Fig. 1, the self-contained unit comprises a housing 25, containing three transmission devices consisting of torque changer 26, torque changer 27 and a flow coupling 28, these transmission devices being arranged, one beside the other, in the order named. A and B denote respectively primary and secondary shafts arranged in adjoining coaxial relation, with one end of the primary or driving shaft A mounted for rotation in a bearing 29 in the housing while the opposite end thereof is mounted in a bearing 30 provided on the adjacent end of the secondary or driven shaft B. A suitable bearing 31 provided for the purpose on the housing accommodates the said shaft B.

The torque changer 26 includes a rotary primary wheel $A^1$, a rotary secondary wheel $B^1$, and a guide wheel 32. The torque changer 27 similarly includes a rotary primary wheel $A^2$, rotary secondary wheel $B^2$ and a guide wheel 33. A web portion or sleeve 101 joining secondary wheels $B^1$ and $B^2$ is journaled in a suitable bearing 102 on the casing 25 between the torque changers. The flow coupling 28 includes a rotary primary wheel $A^3$ and a rotary secondary wheel $B^3$, but has no guide wheel. On the driving shaft A, which is suitably connected with a motor (not shown) or other source of power, are fastened the primary wheels $A^1$ and $A^2$ of the respective torque changers 26 and 27, and also the primary wheel $A^3$ of the flow coupling 28. The corresponding secondary wheels $B^1$, $B^2$ and $B^3$ are all connected together so as to form a common rotary element 34, one end of which is fastened at 35 to the driven shaft B. The primary wheels $A^1$, $A^2$ and $A^3$ act as pump impellers while the secondary wheels $B^1$, $B^2$ and $B^3$ act as turbine runners, all in a way that will be readily understood by those familiar with the art. The torque changers $A^1$, $B^1$ and $A^2$, $B^2$ are distinguished from the flow coupling $A^3$, $B^3$ in that they contain the respective guide wheels 32 and 33 which are stationary, the same being fixedly secured to the housing 25. The coupling alone transmits the torque from the driving shaft to the driven shaft unchanged with an efficiency of from 98 to 99 percent in accordance with the law of action and reaction, whereas the stationary guide wheels 32 and 33 enable the torque changers to transform the torque from zero at the high speed to a certain maximum at the full stop of the driven shaft. Thereby, as will be readily recognized, the speed of the driven shaft automatically adjusts itself to that value which corresponds to the resisting torque. Liquid is supplied to the transmission by means of a pump (see Fig. 3), which draws liquid from the bottom of casing 25 and delivers it by means of pipe s to a distributing or three-way valve $m''$. Operation of the transmission to secure different degrees of torque at the driven shaft is accomplished by simply adjusting valve $m''$ to deliver liquid to the particular torque changer through pipes $p'$, $p''$, or to the coupling through pipe $p$ as desired. In operation of the transmission, liquid is continuously pumped to valve $m''$ and delivered to a particular transmission unit depending upon the setting of the valve. From this unit it is continuously discharged through ports, such as ports 51—54 (see Fig. 2) into the casing 25, from which it is drawn by the pump as above explained.

Assuming that, by way of an example for carrying through a transmission operation, primary shaft A is rotating at the proper speed and rotating with it the primary wheels of torque changers 26, 27 and of the coupling 28, and further assuming that one of the torque changers, for instance, 26 is properly filled with liquid for its operation, then the latter will transfer power due to the liquid being rotated by primary wheel $A^1$ acting as a pump impeller thereby hydraulically causing the actuation of the secondary wheel $B^1$ and of course of the connected secondary wheel $B^2$ and $B^3$ which, however, will be idling, since no liquid is present in torque changer 27 and coupling 28. However, by such operation of $B^1$, power will be transmitted through the common rotary element 34 whereby to drive the shaft B at a lower speed and higher torque than that at which shaft A is operated. With the arrangement shown, the highest possible torque is obtainable through the operation of torque changer 26. Now, assume it is desired to decrease the torque on secondary shaft B, then liquid is discharged from device 26 and simultaneously therewith liquid is admitted into device 27, with the result that, through the actuation of $B^2$ effected by $A^2$, power is transmitted from primary shaft A to secondary shaft B, but at a speed higher and a torque lower than was accomplished when liquid was admitted, as in the first instance above given, under the torque changer 26, and it will be recognized in this connection that during this operation effected through torque changer 27 all of the wheels of 26 and 28 will be idling. If, now, full or substantially full speed of driving shaft A is desired on the driven shaft B, to result in practically the same torque on driven shaft B as is delivered by shaft A, liquid is discharged from torque changer 27 and liquid simultaneously supplied to coupling 28, with the result that power is transmitted from primary shaft A through the medium of primary wheel $A^3$ to secondary wheel $B^3$ and consequently to the secondary shaft B. With coupling 28 thus operated, all the wheels of torque changers 26 and 27 will be running idle. It may be in place to state here that due to the interconnection of the secondary wheels so as to provide the common rotary element 34, the full torque delivered by torque changer 26, if in active operation, is transmitted through the secondary wheels of 27 and 28, and this requires in practice that the said mentioned secondary wheels should be made strong enough to withstand the stresses incurred by such transmission of power. Other operating sequences will readily suggest themselves to those skilled in the art.

The transmission device of my invention is particularly suitable for use in automotive vehicles for starting and when driving uphill, since the inherent losses of the torque changers are not of severe consequence on account of the short duration of the required operation. For normal operation, the flow coupling is of course used, and this coupling operates with substantially no loss in energy.

Figure 4:
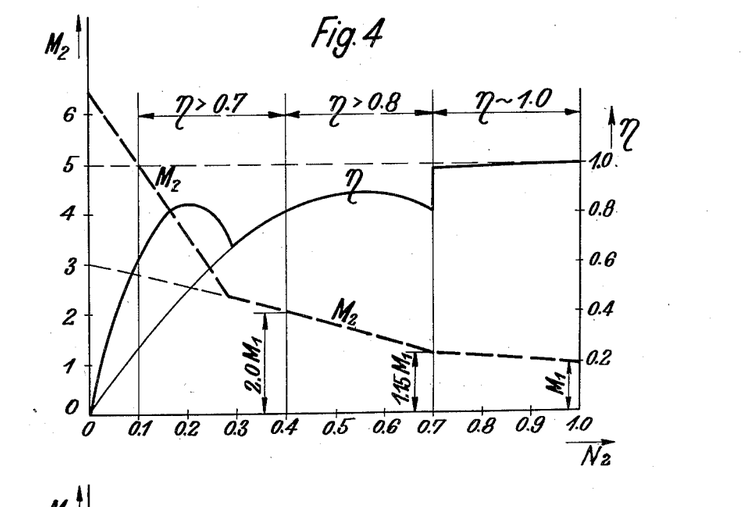
Fig. 4 represents an efficiency and torque diagram corresponding to and explanatory of the arrangement shown in Fig. 1.

Fig. 4 diagrammatically illustrates the operating characteristics of such a transmission. Assuming, for instance, an internal combustion motor develops a torque $M_1$ at its full speed $N_1$ and a torque $1.15 \times M_1$ at a speed of $0.7 \times N_1$ and that it be equipped with a flow coupling $A^3$, $B^3$ and a hydraulic torque changer $A^2$, $B^2$ in such a way that the torque changer, at a speed $N_2=0.7 \times N_1$, also just develops a torque $M_2=1.15 \times M_1$ if the motor thereby runs at its full speed $N_1$, then, at this point, the torque changer has an efficiency $$\eta = \frac{0.7 \times N_1 \times 1.15 \times M_1}{N_1 \times M_1} = \text{about } 0.80.$$

Further, assuming that the torque changer has an efficiency of $\eta > 0.8$ down to a speed of $N_2 = 0.4 \times N_1$ and that at the point in consideration, its efficiency be exactly $\eta = 0.8$, then the torque changer, at this point, develops a torque $$M_2 = \frac{0.8}{0.4} \times M_1 = 2M_1.$$

Now, if for the speeds $N_2 < 0.3 \times N_1$, a second torque changer $A^1$, $B^1$ is added which, within the range of $N_2 = (0.1-0.3) \times N$, may have an efficiency $\eta > 0.7$, the efficiencies will vary according to the heavy curve (for $\eta$) and the torque in accordance to the dashed curve (for $M_2$) of Fig. 4.

Figure 2:
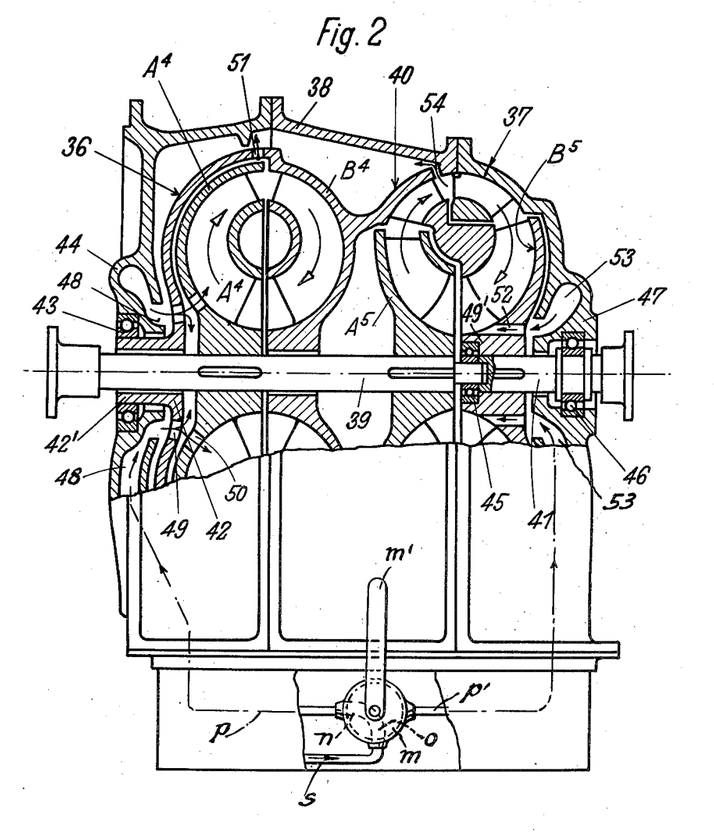
Fig. 2 is a partial sectional view, diagrammatically illustrating one transmission changer in combination with a flow coupling.

In the exemplification of Fig. 2, I show a simplified arrangement in which a flow coupling 36 is in combination with a single torque changer 37, these devices being arranged reversely with respect to the order in which the corresponding devices appear in Fig. 1, so that the coupling 36 appears at the left-hand end of the stationary casing or housing 38. The primary wheels $A^4$ and $A^5$ of the coupling and torque changer respectively are attached to the driving shaft 39; and the secondary wheels $B^4$ and $B^5$ of these respective parts are connected together to provide a common rotary element 40 one end 49' of which is attached to the driven shaft 41 while its opposite end is made in the form of a bearing 42 which rotates on the driving shaft 39. In the present embodiment, this bearing 42 has an extension 42' engaged within a suitable anti-friction device 43 mounted in the stationary end 44 of the casing. The opposite or inner end of the driving shaft 39 is, in this instance, engaged in an anti-friction device 45 arranged in the end 49' of the rotary element 40. The driven shaft 41 is also furnished with an anti-friction bearing 46 arranged in the stationary end 47 of the housing. This view shows, as an example, the manner in which the working liquid may be admitted into and discharged from the liquid chambers of these transmission devices. Thus, the stationary end 44 is represented as being provided with a passage 48 for the inflow of liquid, which may be accomplished either under pressure or by gravity, to suitable openings 49 and 50 provided respectively in the common rotary element 40 and in the primary wheel A⁴. Liquid is discharged from the chamber of the casing through an outlet opening 51. To the chamber in the torque changer, liquid is admitted through an opening 52 in the element 40, while a passage 53 in the stationary end 47 conducts liquid from a source of supply to said opening 52. The outlet for the discharge of liquid from the torque changer chamber is indicated at 54.

By suitable means which may consist of a single motion member $m$, having a lever $m'$, whereby to be operated, liquid may be shut off from the torque changer 37 at the same time liquid is permitted to enter the coupling, and these operations result in emptying the torque changer and filling the coupling whereby slowly to decrease torque transmission by the torque changer and to slowly increase torque transmission by the coupling. In the present embodiment, the lever-operated member $m$ comprises a three-way valve which is adapted, when moved to one position, to bring one of its ports $n$ into register with the pipe line $p$ that leads to the intake passage 48, and simultaneously to move its port $o$ out of register with the pipe line $p'$ that leads to the intake passage 53, and into register with a pump supply line $s$. When the member $m$ is moved to another position, the port $o$ will be brought into register with the pipe line $p'$, while the port $n$ will be moved out of register with the line $p$, and into register with the supply line $s$. Thus by a single movement of the member $m$ either pipe line $p$ or $p'$ is connected with the pump supply line $s$. There is continuous discharge from and flow into the torque changer or the coupling, whichever is in operation.

Figure 3:
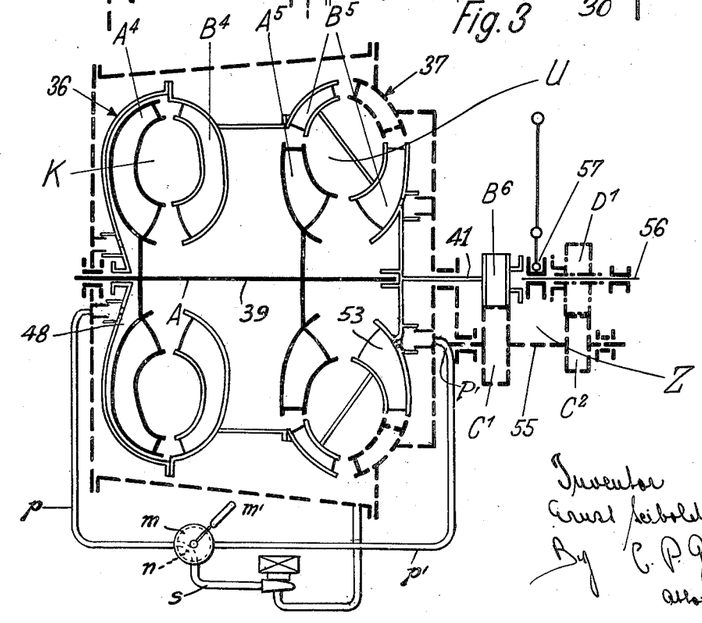
Fig. 3 is a diagrammatic illustration of a torque changer and coupling combination, showing another arrangement of the bearings therefor, and also showing gearing associated with the driven shaft.

In Fig. 3, where I illustrate diagrammatically a similar combination comprising a coupling 36 in combination with a single torque changer 37, I also show in connection therewith, and more particularly on the side of the driven shaft 41, a transmission gearing system comprising gear B⁶ on said shaft 41, gears C¹ and C² on a countershaft 55 and a gear D¹ on a shaft 56 which is separated from and coaxial with the shaft 41. As illustrated in the drawings, the gear B⁶ cooperates with the gear C¹ while the gear D¹ cooperates with the gear C². A shiftable clutch 57 is provided between the shafts 41 and 56 for controlling this transmission gearing. In connection with Fig. 3, there is also illustrated a single motion member $m$ by means of which the supply of working liquid received from the pump supply line $s$ can be diverted either to the line $p$ to pass to the flow coupling 36 or to the line $p'$ to pass to the torque changer 37, and vice versa.

Figure 5:
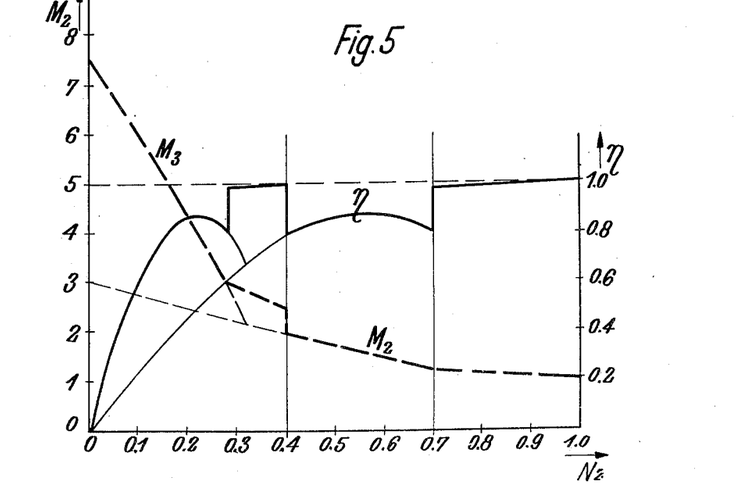
Fig. 5 is a similar diagram corresponding with the arrangement shown in Fig. 3.

This transmission gearing develops the speeds $N_3=0.4N_2$ and correspondingly the torque values $M_3=2.5M_2$. With this arrangement, a characteristic in accordance with Fig. 5 is obtained whereby the part for $N_2=(0.4-1.0) \times N_1$ corresponds to the respective part of diagram Fig. 4. The values for $N_2<0.4 \times N$ are obtained as reduction therefrom on account of the transmission gear. The maximum torque for $N_2=0$ amounts to $7.5M_1$. In the following table the letters used represent U the torque changer, K the coupling, Z the transmission gear:—

| Combination | U+Z | | K+Z | | U | | K |
|---|---|---|---|---|---|---|---|
| $N_1$ | 0 | 0.16 | 0.28 | 0.4 | 0.4 | 0.7 | 1.0 |
| $M_2$ | 3.0 | 2.0 | 1.15 | 1.0 | 2.0 | 1.15 | 1.0 |
| $M_3$ | 7.5 | 5.0 | 2.82 | 2.5 | 2.0 | 1.15 | 1.0 |
| $\eta$ | 0 | >0.8 | ~1.0 | | >0.8~1.0 | | |

In order to start quickly it is simpler to skip combination K+Z and to immediately change over from combination U+Z according to the thin, dashed curve to speed U.

The loss in efficiency is of no importance as it is of very short duration, whereas the operating sequence thereby is considerably simplified. On the other hand, for heavily loaded vehicles as well as driving on the up-grade, combination K+Z is of utmost importance.

The essential advantages of the arrangements described are equally simple control of the torque changer as well as the coupling by means of the valve $m$, extremely smooth and absolutely shock-free change-over from one transmission ratio to the other, long life, and utmost safety of operation, as well as the possibility of having several motors operating parallel on the same drive shaft.

The practical value of the devices explained in principle above may be increased by some special matters in respect of their design. The torque changer with the highest secondary speed has the smallest torque and vice versa. If, for instance, one would arrange the torque changer with the smallest secondary speed on the side of the driving shaft which might be more suitable from the viewpoint of form, then the maximum torque developed by this device would have to be transmitted through all the other torque changers which would require a respective additional amount of material. This amount of material (weight) will be a minimum if the torque changer with the maximum secondary speed is arranged on the side of the driving shaft and that with the smallest secondary speed on the side of the driven shaft.

Figure 6:
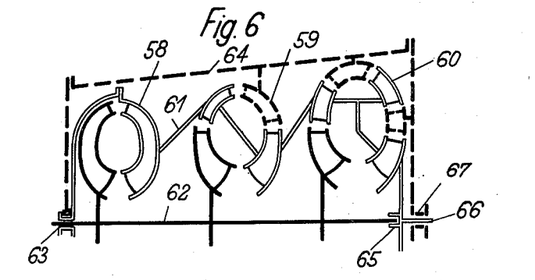
Fig. 6 is another diagrammatic illustration, showing two torque changers associated with a coupling, with the driving shaft supported in the rotating secondary part of the coupling arranged at one side of said shaft.

It, furthermore, should be endeavored to reduce the axial thrust, the losses on account of friction and the losses through the clearances as well as the friction losses in the bearings to a minimum. This result is obtained if all the parts rotating with the driven shaft are combined to provide a uniform rotating element which embraces the driving parts in such a way that the same can be supported by only two bearings in the driven part. Various bearing arrangements, providing for a compact unit, small weight and low cost, are illustrated diagrammatically in Figs. 6, 7, 8 and 9, in each of which I show a self-contained unit comprising a flow coupling 58 in combination with two torque changers 59 and 60. In Fig. 6, it will be seen that the uniform rotary element 61 includes adjacent the power-receiving end of the driving shaft 62 a bearing 63 arranged in the housing 64 and which revolubly embraces the driving shaft 62. The opposite end of the element 61 includes a bearing 65 in which the adjacent inner end of the driving shaft is rotatably engaged. The driven shaft 66 is disposed in a bearing 67 in the housing.

Figure 7:
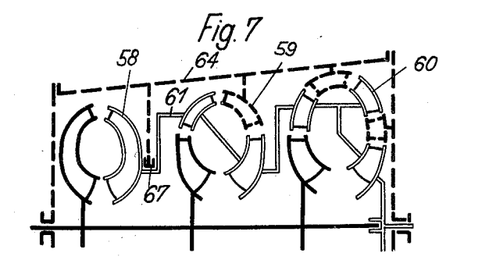
Fig. 7 is a view similar to Fig. 6, but showing on the housing a bearing arranged for the secondary part, and located between the coupling and torque changer instead of between the two torque changers as shown in Fig. 1.

In Fig. 7 the housing 64 is provided with a bearing 67 between the coupling 58 and torque changer 59 and in this bearing the uniform rotary element 61 is revolubly mounted.

Figure 8:
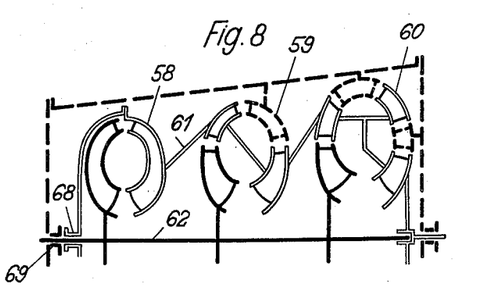
Fig. 8 is a view similar to Fig. 6, but showing two separate bearings for the driving shaft, one being stationary and one rotating.

If the rotating parts are supported in this manner, it is sufficient to provide in the housing a bearing on the side of the driving shaft only for the driving shaft and on the side of the driven shaft only for the driven shaft. This allows the most simple connecting conditions. It is, however, also possible to support the driven shaft in both bearings of the housing in which case it is not necessary to provide such bearings for the driving shaft and vice versa. In Fig. 8 the bearing 68 integrally connected with the rotary element 61 turns on the driving shaft 62 the power-receiving end of which is journaled in a bearing 69 in the housing.

Figure 9:
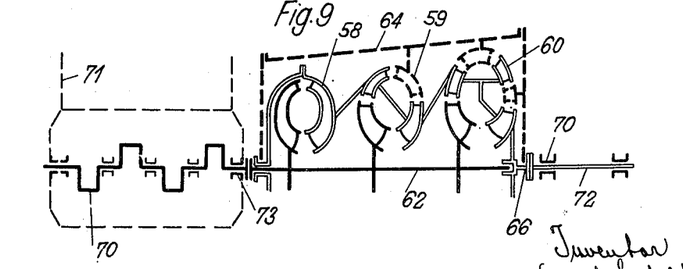
Fig. 9 is a diagrammatic development, showing an engine crank shaft associated with the driving shaft, and with the driving shaft supported in the rotating secondary part, at one end, and, at the other end, by the crank shaft bearing adjacent to it but with no bearing located between the individual devices for supporting the rotating part.
Figures 10, 11, 12:
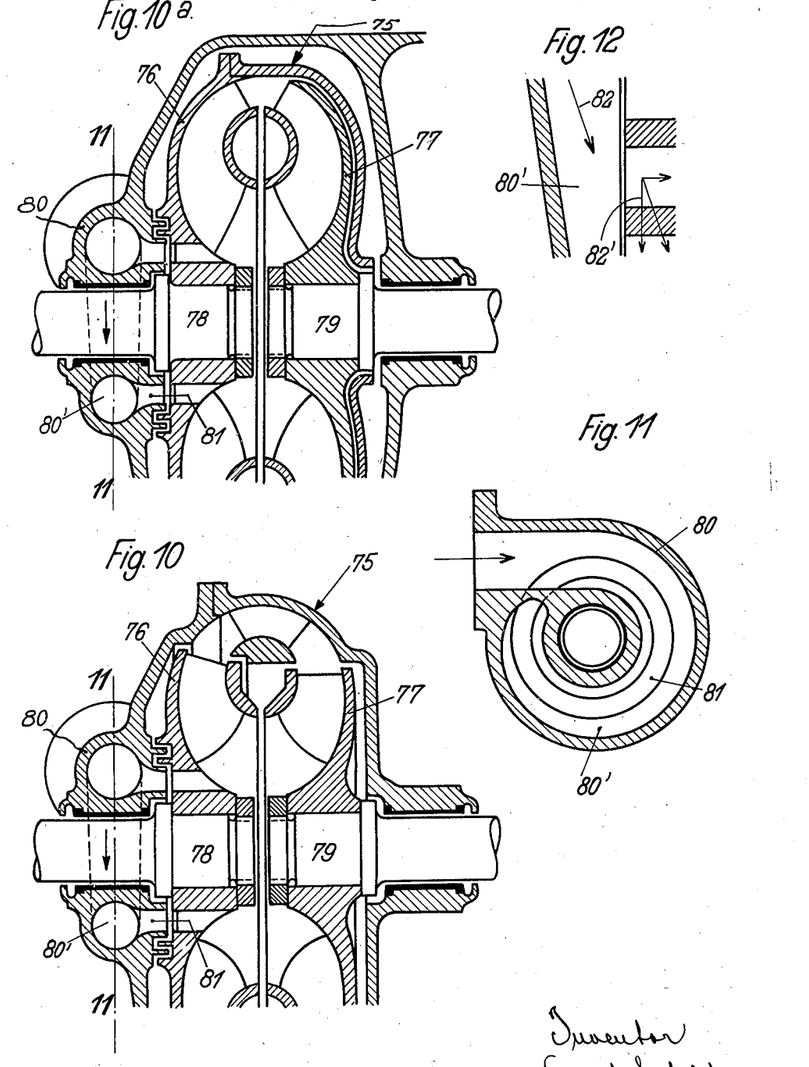

In Fig. 9, I disclose a crank shaft 70 of motor 71 connected with the power-receiving end of the driving shaft 62, and a driven device 72 connected with the power delivering end of the driven shaft 66. In this case the bearings 73 and 74 in which the respective shafts 62 and 66 find their operative support, are located exteriorly of the housing 64. Therefore, in this arrangement, special bearings on the housing are omitted, and, on the side of the driving shaft, the driving transmission shaft can be directly coupled with the shaft of the driving engine, and, on the side of the driven shaft, the driven transmission means can be directly coupled with the driven shaft.

In the employment of hydraulic transmission couplings of the class which are put in operation by filling the same with liquid and which are taken out of operation by draining the liquid therefrom, it is under certain conditions necessary to effect the filling operation in the shortest possible time. It will be appreciated that the filling time will be shortened proportionately to the amount of liquid that can be admitted in the transmission per second.

The devices heretofore used for the purpose lack efficiency inasmuch as in most cases the flow velocity in the intake pipe is reduced or effectively destroyed in an annular chamber near the axis of the rotating transmission due to the cross currents produced in the chamber, thereby making it difficult for the liquid to flow from the stationary intake pipe into the rotating wheels. With my present improvements, these drawbacks are overcome by providing at the end of the intake pipe a spiral similar to those used with hydraulic turbines. This spiral is arranged so that the operating liquid can enter the rotating parts equally distributed around the shaft, and therefore the flow velocity existing in the intake pipe is transformed into rotational velocity in a stream with strictly parallel paths so that an almost loss-free transmission of the liquid from the stationary intake spiral into the rotating parts is attained.

Referring to the example shown in Figs. 10 to 12, 75 denotes in general a hydraulic coupling or torque changer the primary and secondary wheels 76 and 77 of which are represented as attached respectively to the driving and driven shafts 78 and 79. 80 denotes the stationary intake pipe for the working liquid and this pipe is characterized by the fact that its delivery end or portion 80' is made in the form of a spiral of the type used for intake spirals of hydraulic turbines. Due to the spiral portion, the working fluid is caused to enter to the working wheels of the transmission equally distributed over the annulus 81 and in such manner as to have approximately the same rotational velocity as the rotating parts of the coupling. The velocities given to the liquid entering the coupling from the spiral are indicated by the arrows 82 and 82' in the section of diagram of Fig. 12.

According to another characteristic feature of my invention, means are provided whereby to obtain shock-free draining of the working liquid from a hydraulic flow coupling or a hydraulic flow transmission.

In the use of hydraulic flow couplings or transmissions, it is in many instances desirable to provide for the outward discharge of the working liquid from the rotating parts during their operation. If for any reason, as for instance, if such a coupling is applied to an automotive vehicle, the housing around the coupling must be kept small in diameter, there is danger that the discharged liquid will repeatedly get in contact with the rotating elements of the coupling, whereby much energy is wasted. Tests have shown that these losses are liable to increase to such an amount that the application of the coupling or transmission becomes uneconomical.

This difficulty is avoided by my present improvements which provide for the discharge of the liquid from the rotating parts into stationary elements in such a way that the liquid will be carried away from the rotating parts with no chance of getting in contact with the same again. This result is obtained according to my improvements by providing a stationary housing around the coupling or transmission for carrying away the discharged liquid without shock. Usually the rotating wheels of hydraulic flow couplings or hydraulic flow transmissions are provided with discharge holes at their outer circumference. Through these holes the liquid is discharged in rotating jets in a plane perpendicular to the axis of rotation. If in the immediate vicinity of the rotating parts a stationary element is arranged having a smoothly bent guiding wall which, near the discharge openings, adapts itself as closely as possible to the direction of the discharge jets, then the latter will be deflected by the said wall shock-free and carried from the discharge plane. It is desirable to make the stationary housing around the coupling or transmission of such form and extent that the liquid jets coming along the deflecting wall will lose their energy by friction and consequently drop from the deflecting wall to the inner wall of the housing by gravity. In order to prevent the discharged liquid from falling back on the coupling where it will absorb more energy, the inner wall of the stationary housing may be provided with an additional wall parallel to the deflecting wall.

Figure 13:
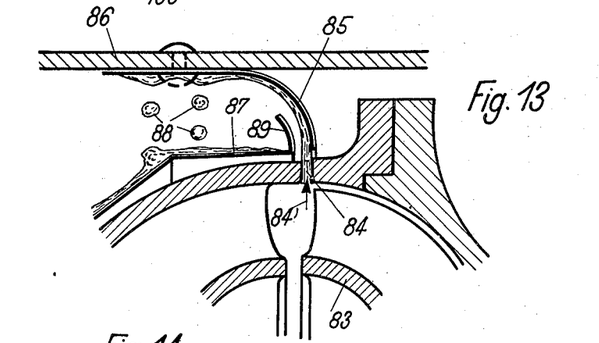
Fig. 13 is a sectional view diagrammatically illustrating the stationary housing for carrying liquid away from a transmission device.
Figure 14:
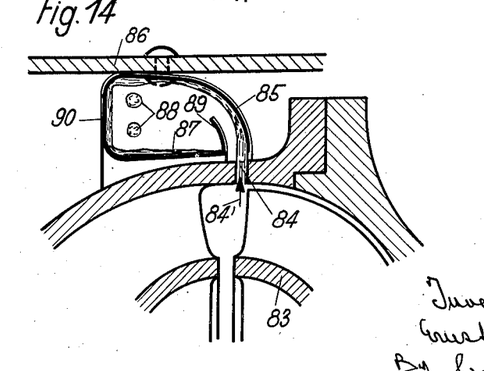
Fig. 14 is a similar view, but showing an arrangement by means of which the liquid is drained along the circumference of the rotating parts.

Examples of the constructional means whereby the desired results may be attained are shown in the fragmentary sectional illustrations of Figs. 13 and 14, wherein the rotating coupling 83 is represented as being provided at its circumference with a discharge bore 84 (of which in practice there are a number of such bores equally spaced from each other). From these bores jets of liquid are discharged in the direction indicated by the arrows 84'. These jets are deflected by a wall 85 provided on the stationary housing 86 and eventually fall on a wall 87 as drops 88. The wall 87 embraces the coupling as closely as possible and its end 89 is bent parallel to the deflecting wall 85.

In the form shown in Fig. 13, the liquid caught by wall 87 is drained towards the shaft of the coupling, whereas in the form shown in Fig. 14, the liquid is reclaimed by wall 90 and consequently drained along the circumference. These devices carry the liquid to the liquid sump and fulfill the task of preventing the liquid from getting in contact with the rotating elements of the coupling or transmission once it has been discharged from the same.

Figure 15:
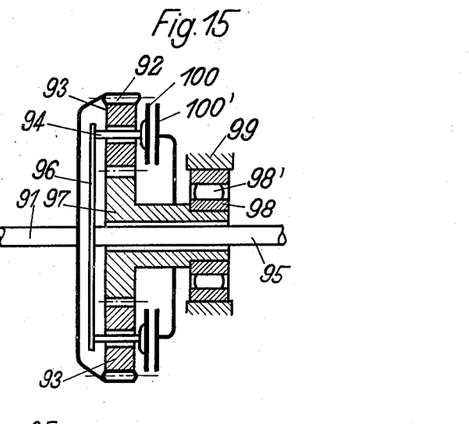
Fig. 15 is a central sectional view through a planetary gear coupling arrangement.
Figure 16:
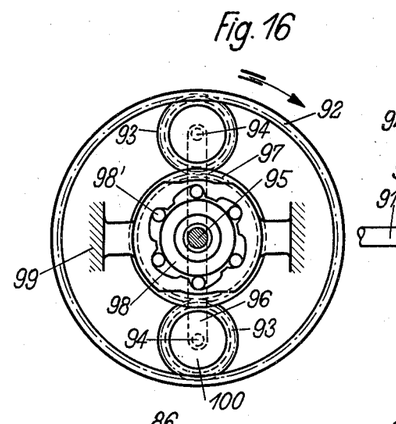
Fig. 16 is an end view thereof.

In Figs. 15 and 16, I disclose a variable gear transmission with planetary gears, the outer gear of which is rigidly connected with the driving shaft in order to provide a simple means for changing gears which, with this device, is possible without shifting gears axially, relatively to each other.

Said figures illustrate one possible construction for carrying my objects and purposes into effect.

On the driving shaft 91 an internally toothed gear 92 is arranged which is in gear with planetary pinions 93. These planetary pinions are arranged rotatably around bolts 94, which bolts are rigidly connected with the driven shaft 95 by arms 96. The center or sun-wheel 97 is rotatably supported by shaft 95. It is equipped with friction ratchet gear parts 98, 98' which, cooperating with the housing 99, allow the free rotation of sun-wheel 97 in the direction of rotation of the driving shaft, but prevent a rotation in the reverse direction. A detachable coupling, comprising cooperating parts 100, 100', makes it possible to fixedly connect sun-wheel 97 with the driven shaft 95.

The device functions as follows: when the coupling parts 100, 100' are disconnected as illustrated in Fig. 15, the sun-wheel would, due to the resisting turning moment on shaft 95 together with arms 96, turn in the opposite direction of rotation if it were not prevented from doing so by the friction ratchet gear parts 98, 98', the effect of this being that a stepping down of the speed from shaft 91 to shaft 95 takes place. When the coupling parts 100, 100' are engaged, the planetary gears 93 are no longer free to move relatively to the sun-wheel 97 which also prevents them from rotating relatively to outer gear 93 so that both shafts are interlocked and necessarily rotate with the same speed. This arrangement offers the important advantage that the ratchet gear parts 98, 98' as well as the coupling parts 100, 100' have to be designed only for a fraction of the total torque to be transmitted. Another advantage is found in the fact that with the coupling engaged, the gears are not in relative motion to each other and therefore no loss due to friction in the gears takes place. The device represents a very compact and light unit.

While my improvements have been illustrated and described with some degree of particularity, it is realized that in practice various changes and alterations may be made in the same, and further that the improvements are capable of embodiment in many different constructions. It has been sought herein to illustrate only such embodiments as will suffice to exhibit the character of the improvements. Reservation is, therefore, made to the right and privilege of changing the form of the details of construction as herein presented or otherwise altering the arrangement of the parts without departing from the spirit or scope of the improvements or the scope of the appended claims.

I claim:—

1. A hydraulic variable speed transmission comprising a coupling unit and a plurality of torque transformer units having different ratios, means for supplying working liquid to said transmission, said units being adapted to operate when connected with said liquid supplying means and to discontinue operation when disconnected therefrom, and means adapted to connect one torque transformer with said liquid supplying means while simultaneously disconnecting another torque transformer from said means, whereby to gradually step up and down the speed and the torque, respectively, obtained from said transmission.

2. A hydraulic variable speed transmission comprising a coupling unit and a plurality of torque transformer units having different ratios, means for supplying working liquid to said transmission, said units being adapted to operate when connected with said liquid supplying means, and to discontinue operation when disconnected therefrom, and a valve adapted to connect one unit with said liquid supplying means while disconnecting the other units from said means, whereby to gradually change the ratio of speed and torque transmission.

3. A hydraulic variable speed transmission comprising at least three hydraulic transmission units, one unit being provided as a coupling so as to be optionally used, each unit having a primary, driving member and a secondary, driven member, said driving members being arranged on a common axis, means for driving said axis at a primary speed, means for supplying working liquid to the transmission, said units being adapted to operate when connected with said liquid supplying means, and to discontinue operation when disconnected therefrom, means for connecting one unit with said liquid supplying means and simultaneously disconnecting the other units from said means, and means driven by said secondary members at a secondary speed varying according to the unit selected, that unit producing the highest secondary speed being arranged on the side toward the means for driving said primary driving members and that unit producing the lowest secondary speed being arranged on the side toward said means driven by said secondary members.

ERNST SEIBOLD.